(12) United States Patent
Muramatsu et al.

(10) Patent No.: US 8,333,068 B2
(45) Date of Patent: Dec. 18, 2012

(54) EXHAUST HEAT RECOVERY DEVICE

(75) Inventors: Kenshirou Muramatsu, Nishio (JP); Yasutoshi Yamanaka, Kariya (JP); Kimio Kohara, Nagoya (JP); Yuuki Mukoubara, Chiryu (JP)

(73) Assignee: Denso Corporation, Kariya (JP)

( * ) Notice: Subject to any disclaimer, the term of this patent is extended or adjusted under 35 U.S.C. 154(b) by 220 days.

(21) Appl. No.: 12/653,256

(22) Filed: Dec. 10, 2009

(65) Prior Publication Data

US 2010/0146943 A1 Jun. 17, 2010

(30) Foreign Application Priority Data

Dec. 11, 2008 (JP) .................................. 2008-316185

(51) Int. Cl.
*F01N 3/02* (2006.01)

(52) U.S. Cl. ........................................ 60/320; 60/321

(58) Field of Classification Search .................. 60/300, 60/320, 298; 165/41, 42, 104.19, 272, 274, 165/276, 279, 281, 282, 301, 302, 104.17, 165/104.21, 299
See application file for complete search history.

(56) References Cited

U.S. PATENT DOCUMENTS

| | | | | |
|---|---|---|---|---|
| 3,962,869 | A * | 6/1976 | Wossner | 60/298 |
| 5,899,063 | A * | 5/1999 | Leistritz | 60/298 |
| 6,151,891 | A * | 11/2000 | Bennett | 60/298 |
| 6,347,511 | B1 * | 2/2002 | Haines | 60/274 |
| 6,427,640 | B1 * | 8/2002 | Hickey et al. | 123/41.31 |
| 7,178,332 | B2 * | 2/2007 | Sasaki | 60/320 |
| 7,832,204 | B2 * | 11/2010 | Bidner et al. | 60/320 |
| 7,845,167 | B2 * | 12/2010 | Miyagawa et al. | 60/320 |
| 7,877,991 | B2 * | 2/2011 | Miyagawa et al. | 60/320 |
| 2003/0145583 | A1 * | 8/2003 | Tanaka et al. | 60/298 |
| 2004/0060292 | A1 * | 4/2004 | Minemi et al. | 60/616 |
| 2006/0130469 | A1 * | 6/2006 | Baeuerle et al. | 60/300 |
| 2007/0284087 | A1 | 12/2007 | Kohara et al. | |
| 2009/0293461 | A1 * | 12/2009 | Miyagawa et al. | 60/299 |
| 2010/0154394 | A1 * | 6/2010 | Partridge et al. | 60/298 |

FOREIGN PATENT DOCUMENTS

JP 3-227716 10/1991

(Continued)

OTHER PUBLICATIONS

English Equivalent of WO-2007142292.*

(Continued)

*Primary Examiner* — Thomas Denion
*Assistant Examiner* — Patrick Maines
(74) *Attorney, Agent, or Firm* — Harness, Dickey & Pierce, PLC

(57) ABSTRACT

An exhaust heat recovery device is provided with an evaporation portion for evaporating an operation fluid flowing therein by performing heat exchange with exhaust gas of an engine, a condensation portion for condensing the operation fluid flowing from the evaporation portion by performing heat exchange with coolant of the engine, and a flow adjusting portion for adjusting a flow amount of the operation fluid flowing from the condensation portion to the evaporation portion. A catalyst temperature detector is adapted to detect a temperature of a catalyst for purifying the exhaust gas, and a control unit sets a catalyst heating mode when the detected temperature of the catalyst is lower than a threshold value. Furthermore, the control unit causes the flow adjusting portion to adjust the flow amount of the operation fluid from the condensation portion to the evaporation portion at zero, in the catalyst heating mode.

16 Claims, 6 Drawing Sheets

FOREIGN PATENT DOCUMENTS

| | | |
|---|---|---|
| JP | 5-44445 | 2/1993 |
| JP | 7-218160 | 8/1995 |
| JP | 2008-014625 | 1/2008 |
| JP | 2008-190437 | 8/2008 |
| WO | WO 2007142292 A1 * | 12/2007 |

OTHER PUBLICATIONS

Office action dated Sep. 6, 2011 in corresponding Japanese Application No. 2008-316185.

* cited by examiner

EXHAUST HEAT RECOVERY DEVICE

CROSS REFERENCE TO RELATED APPLICATION

This application is based on Japanese Patent Application No. 2008-316185 filed on Dec. 11, 2008, the contents of which are incorporated herein by reference in its entirety.

FIELD OF THE INVENTION

The present invention relates to an exhaust heat recovery device for recovering heat from exhaust gas of an engine.

BACKGROUND OF THE INVENTION

Conventionally, an exhaust heat recovery device is known, for example, in JP 2008-190437A. The exhaust heat recovery device includes a heat recovery unit and a coolant flow adjusting unit. The heat recovery unit is located in an exhaust gas pipe of an internal combustion engine to perform heat exchange between coolant flowing therein and exhaust gas passing through the exhaust gas pipe. A catalyst is provided in the exhaust heat recovery device such that heating of the catalyst is performed by using exhaust gas in the exhaust gas pipe. The coolant flow adjusting unit is located to adjust a flow amount of the coolant flowing in the heat recovery unit. When the heating of the catalyst is performed after the operation of the engine starts, the flow amount of the coolant flowing through the heat recovery unit is reduced to be lower than a predetermined amount by the coolant flow adjusting unit, thereby reducing a heat-absorbing amount of the coolant from the reaction heat generated by the catalyst.

However, in the exhaust heat recovery device described in JP 2008-190437A, because the coolant and the exhaust gas are directly heat-exchanged in the heat recovery unit, the reaction heat generated from the catalyst may be easily transmitted to the coolant. During the heating of the catalyst after the engine starts operating, when the flow amount of the coolant is made lower than the predetermined amount in order to facilitate the heating of the catalyst, the coolant may be boiled by receiving heat from the exhaust gas. Conversely, if the flow amount is adjusted by the coolant flow adjusting unit to a value without causing the boiling of the coolant, the heating of the catalyst may delay. Thus, it may be difficult to facilitate the heating of the catalyst while preventing the boiling of the coolant, in the above exhaust heat recovery device.

SUMMARY OF THE INVENTION

In view of the foregoing problems, it is an object of the present invention to provide an exhaust heat recovery device which can realize both of an early heating of a catalyst and prevention of a boiling of coolant.

According to an aspect of the present invention, an exhaust heat recovery device for recovering heat from exhaust gas of an engine includes a catalyst located to purify the exhaust gas, a heat recovery unit, a catalyst temperature detector adapted to detect a temperature of the catalyst, and a control unit configured to set a catalyst heating mode when the temperature of the catalyst detected by the catalyst temperature detector is lower than a first threshold value. The heat recovery unit includes an evaporation portion configured to evaporate an operation fluid flowing therein by performing heat exchange between the operation fluid and the exhaust gas and configured to be capable of cooling the catalyst, a condensation portion configured to cool and condense the operation fluid flowing from the evaporation portion by performing heat exchange between the operation fluid and a coolant for cooling the engine, and a flow adjusting portion configured to adjust a flow amount of the operation fluid flowing from the condensation portion to the evaporation portion. In the exhaust heat recovery device, the control unit causes the flow adjusting portion to adjust the flow amount of the operation fluid from the condensation portion to the evaporation portion at zero in the catalyst heating mode.

Because the evaporation portion is configured to be capable of cooling the catalyst, a super-heating of the catalyst can be suppressed by the heat recovery unit. Furthermore, because the control unit causes the flow adjusting portion to adjust the flow amount of the operation fluid from the condensation portion to the evaporation portion at zero in the catalyst heating mode, the exhaust gas is not cooled in the evaporation portion, thereby facilitating the heating of the catalyst when the temperature of the catalyst is lower than the first threshold value. Furthermore, because the flow amount of the operation fluid from the condensation portion to the evaporation portion is set at zero by the flow adjusting portion, the heat exchange amount between the coolant (operation fluid) and the exhaust gas can be set substantially at zero, thereby preventing the boiling of the coolant.

For example, the control unit may be configured to set a catalyst cooling mode when the temperature of the catalyst detected by the catalyst temperature detector is higher than a second threshold value that is larger than the first threshold value. In the catalyst cooling mode, the control unit causes the flow adjusting portion to adjust the flow amount of the operation fluid, such that the temperature of the catalyst detected by the catalyst temperature detector becomes equal to or higher than the first threshold value and lower than the second threshold value.

A coolant temperature detector may be provided in the exhaust heat recovery device to detect a temperature of the coolant. In this case, the control unit causes the flow adjusting portion to adjust the flow amount of the operation fluid from the condensation portion to the evaporation portion, such that the temperature of the coolant detected by the coolant temperature detector is lower than a third threshold value, in the catalyst cooling mode.

Alternatively/Further, the control unit may be configured to set a catalyst keeping mode when the temperature of the catalyst detected by the catalyst temperature detector is equal to or higher than the first threshold value and is lower than the second threshold value. In this case, the control unit causes the flow adjusting portion to adjust the flow amount of the operation fluid in the catalyst keeping mode, such that the temperature of the catalyst detected by the catalyst temperature detector is approached to the first threshold value.

As an example, the evaporation portion may be located in an exhaust gas pipe, in which the exhaust gas of the engine flows, at a position downstream of an exhaust manifold that is positioned at one end portion of the exhaust gas pipe adjacent to the engine. Alternatively, the evaporation portion may be located on an outer surface of the exhaust gas pipe, in which the exhaust gas of the engine flows. Furthermore, the evaporation portion may be located on the surface of the exhaust gas pipe, at a position where the catalyst is held in the exhaust gas pipe. Alternatively, the evaporation portion may be located on an outer surface of the exhaust manifold that is positioned at one end portion of the exhaust gas pipe adjacent to the engine. Alternatively, the catalyst may be provided integrally with the evaporation portion.

The heat recovery unit may be a heat pipe type, which includes an evaporation pipe through which the evaporated operation fluid of the evaporation portion flows into the condensation portion, and a condensation pipe through which the condensed operation fluid of the condensation portion flows to the evaporation portion. In this case, the flow adjusting portion may be located to adjust the flow amount of the operation fluid flowing from the condensation portion to the evaporation portion via the condensation pipe.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

First Embodiment

Figure 1:
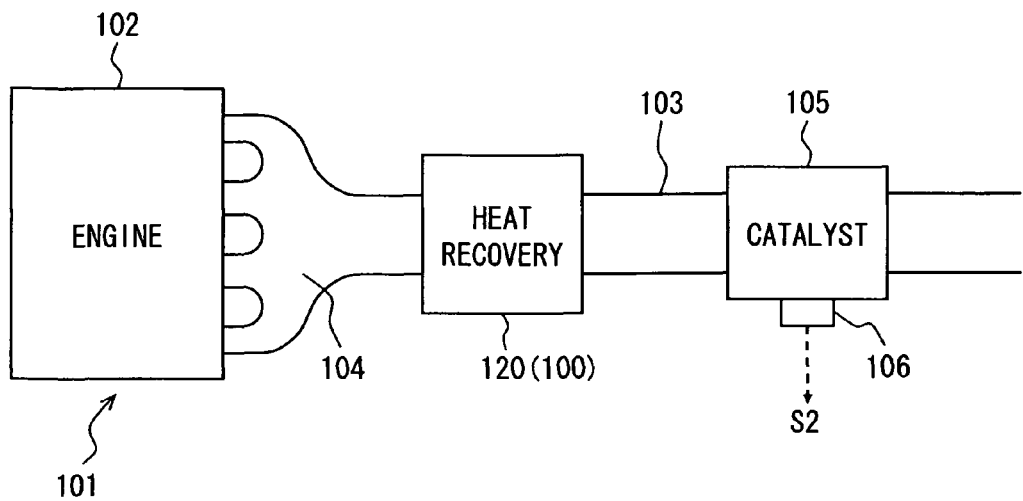
FIG. 1 is a schematic diagram showing an exhaust heat system to which an exhaust heat recovery device according to a first embodiment of the present invention is adapted.
Figure 2:
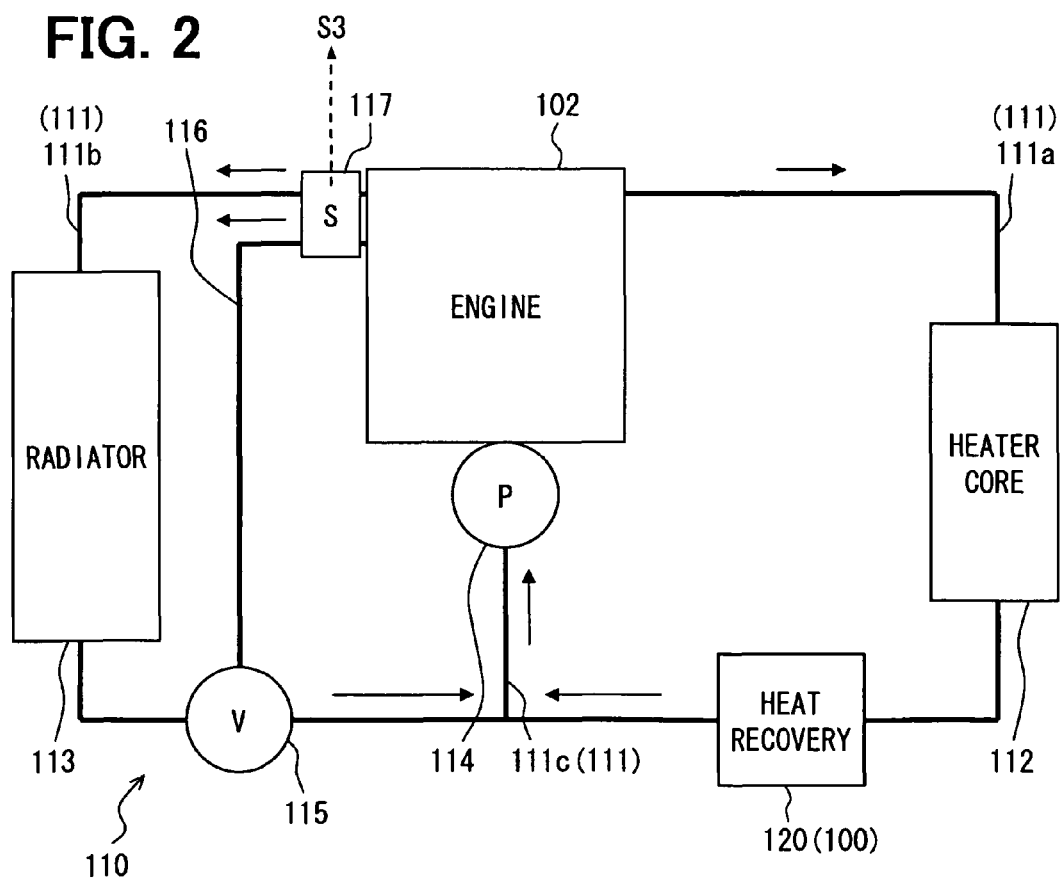
FIG. 2 is a schematic diagram showing a coolant system to which the exhaust heat recovery device according to the first embodiment is adapted.

A first embodiment of the present invention will be described with reference to FIGS. 1 to 5E. First, an exhaust heat recovery device 100 according to the first embodiment will be now described. In the first embodiment, the exhaust heat recovery device 100 is typically used for an exhaust gas system 101, as shown in FIG. 1. As shown in FIG. 2, the exhaust heat recovery device 100 is located in a coolant system 110 of an engine 102 of a vehicle. In FIG. 2, the arrows indicate the flow of the coolant. The exhaust heat recovery device 100 includes a heat recovery unit 120 shown in FIG. 3 and a control unit 180 shown in FIG. 4, for example.

The exhaust gas system 101 is provided with the engine 102 that is an internal combustion engine, an exhaust gas pipe 103 in which exhaust gas discharged from the engine 102 flows, a catalyst 105 located in the exhaust gas pipe 103 to purify the exhaust gas flowing through the exhaust gas pipe 103, and the heat recovery unit 120. The heat recovery unit 120 is located in the exhaust gas pipe 103 upstream of the catalyst 105 so as to recover heat (i.e., exhaust heat) of the exhaust gas.

An exhaust manifold 104 is located at one end side of the exhaust gas pipe 103 adjacent to the engine 102, and is branched into four passages toward the engine 102. The exhaust manifold 104 is located such that the branched four passages of the exhaust manifold 104 communicate with the pistons of the engine 102, respectively. A catalyst temperature sensor 106 is located in the catalyst 105 to detect the temperature of the catalyst 105, and outputs a catalyst temperature signal S2 corresponding to the detected temperature of the catalyst 105 to the control unit 180.

The coolant system 110 is adapted to cool the engine 102 by using the coolant, and is adapted to recover exhaust heat by performing heat exchange between the coolant and the exhaust gas. The coolant system 110 is used for a heating of the engine 102 or/and is used as a heating source of a heater core 112. According to the present embodiment, the coolant system 110 is provided with a coolant passage 111 that is configured by first, second and third coolant passages 111a, 111b and 111c, for example. In the coolant system 110, the respective coolant passages 111a, 111b and 111c are suitably switched so as to selectively perform cooling or heating of the engine 102.

As shown in FIG. 2, the heater core 112 and the heat recovery unit 120 are located in the first coolant passage 111a, a radiator 113 is located in the second coolant passage 111b, and an electrical pump 114 is located in the third coolant passage 111c. In the present embodiment, when the first, second and third coolant passages 111a, 111b, 111c are not necessary to be distinguished from each other, the coolant passage 111 is used for the explanation.

Next, the exhaust gas system 101 and the coolant system 110 will be described in detail based on FIGS. 1 and 2.

The engine 102 is a device, which generates power by burning mix gas between a supplied fuel and air. For example, the engine 102 may be a gasoline engine or a diesel engine or the like, which is generally known. The engine 102 may be mounted to a hybrid vehicle. As shown in FIG. 2, the engine 102 is provided with a coolant temperature sensor 117 adapted to detect the temperature of the coolant. In the example of FIG. 2, the coolant temperature sensor 117 is provided at a coolant outlet side of the engine 102. A coolant temperature signal S3 corresponding to the detected coolant temperature of the coolant temperature sensor 117 is output to the control unit 180.

The radiator 113 is located in the second coolant passage 111b so as to cool the coolant flowing therein by performing heat exchange between the coolant and outside air. An electrical fan for blowing air toward the radiator 113 may be provided in the example of FIG. 2. In this case, the cooling of the coolant in the radiator 113 can be facilitated by using the air blown by the electrical fan. An electrical pump 114 is provided with an electrical motor, and is configured to circulate the coolant in the coolant passage 111 by driving the electrical motor. For example, an electrical power is supplied to the electrical pump 114 from a battery (not shown), and the rotation speed of the electrical pump 114 is controlled based on a control signal from the control unit 180.

A valve unit 115 is located at a join portion at which the second coolant passage 111b and a bypass passage 116 are joined. The coolant flowing from the engine 102 passes through the bypass passage 116 while bypassing the radiator 113. The valve unit 115 is configured by a thermostat, to automatically open the second coolant passage 111b when the temperature of the coolant is higher than a predetermined temperature. When the valve unit 115 opens the second coolant passage 111b in a case where the temperature of the coolant, is higher than the predetermined temperature, the coolant passes through the radiator 113 and is cooled, thereby preventing overheating of the engine 102. In contrast, when the temperature of the coolant is lower than the predetermined temperature, the valve unit 115 configured by the thermostat closes the second coolant passage 111b. In this case, the coolant flowing out of the engine 102 flows through the bypass passage 116 without passing through the radiator 113, thereby preventing a temperature reduce of the coolant and an overcooling of the engine 102.

The heat recovery unit 120 has therein a sealed container in which an operation fluid is filled. In the present embodiment, real water can be used as the operation fluid filled in the sealed container of the heat recovery unit 120. The heat recovery unit 120 includes an evaporation portion 130 and a condensation portion 140 which are air-tightly connected circularly by a vapor passage 150 and a liquid passage 16, so as to configure the sealed container. The evaporation portion 130 is located in an exhaust gas passage 131, and the condensation portion 140 is located in a coolant tank 141, in the example of FIG. 3.

The evaporation portion 130 is a heat exchanger, in which the operation fluid is heat exchanged with the exhaust gas flowing in the exhaust gas passage 131, and is evaporated by receiving heat from the exhaust gas. The evaporation portion 130 includes a plurality of evaporation tubes 132 in which the operation fluid flows, a pair of first and second evaporation headers 133a, 133b configured to communicate with the evaporation tubes 132 at two longitudinal ends of the evaporation tubes 132, and heat-transmission fins 134 attached to the outer walls of the evaporation tubes 132.

The condensation portion 140 is a heat exchanger, in which the operation fluid is heat exchanged with the coolant of the engine 102, flowing in the coolant tank 141, and is condensed by radiating heat to the coolant of the engine 102. The condensation portion 140 includes a plurality of condensation tubes 142 in which the operation fluid flows, and a pair of first and second condensation headers 143a, 143b configured to communicate with the condensation tubes 142 at two longitudinal ends of the condensation tubes 142. The coolant tank 141 is connected to the first coolant passage 111a via two connection pipes 144.

Figure 3:
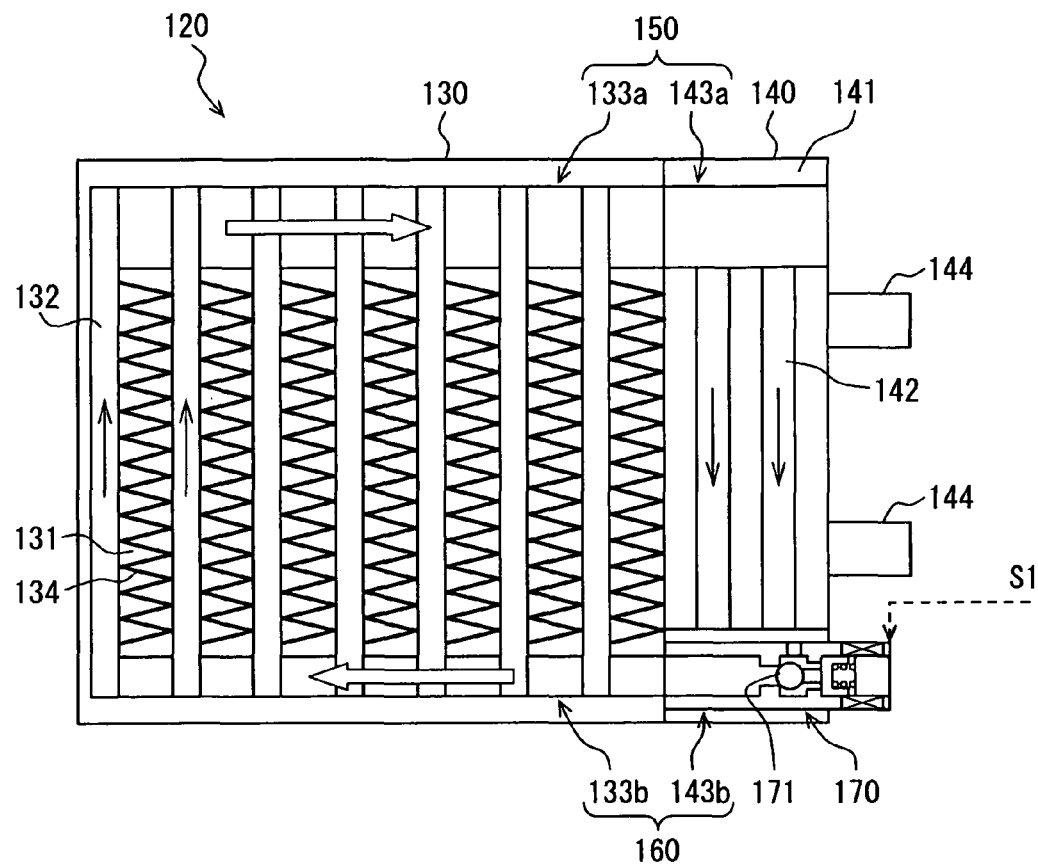
FIG. 3 is a schematic sectional view showing a heat recovery unit of the exhaust heat recovery device according to the first embodiment.

The evaporation portion 130 and the condensation portion 140 are connected by using the headers 133a, 143a, 133b and 143b. As shown in FIG. 3, the first evaporation header 133a at one end side of the evaporation portion 130 and the first condensation header 143a at one end side of the condensation portion 140 are continuously extended so as to form the vapor passage 150. Similarly, the second evaporation header 133b at the other end side of the evaporation portion 130 and the second condensation header 143b at the other end side of the condensation portion 140 are continuously extended so as to form the liquid passage 160. Therefore, the gas-phase operation fluid boiled by receiving heat from the exhaust gas in the evaporation portion 130 flows into the first condensation header 143a from the first evaporation header 133a, and is condensed while passing through the condensation tubes 142 to be a liquid-phase operation fluid by radiating heat to the coolant in the condensation portion 140. Then, the condensed liquid-phase operation fluid flows into the second evaporation header 133b from the second condensation header 143b.

The heat recovery unit 120 according to the present embodiment is further provided with a mode switching valve 170, which is configured to adjust a flow amount of the operation fluid flowing from the condensation portion 140 to the evaporation portion 130. In the example of FIG. 3, the mode switching valve 170 is located in the second condensation header 143b, and includes a valve body 171 configured to open and close the liquid passage 160 based on a flow amount adjusting signal outputted from the control unit 180. As an example, the valve body 171 is provided in the mode switching valve 170 to open and close the liquid passage 160 by an electromagnetic force.

Figure 4:
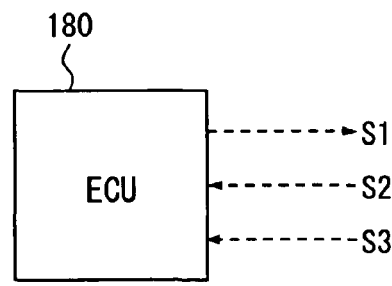
FIG. 4 is a schematic diagram showing a control unit of the exhaust heat recovery device according to the first embodiment.

The control unit 180 is provided with a microcomputer and circumferential circuits. The microcomputer includes CPU, ROM and RAM and the like, which are generally known. As shown in FIG. 4, a catalyst temperature signal S2 that is a detection signal from the catalyst temperature sensor 106, and a coolant temperature signal S3 that is a detection signal from the coolant temperature sensor 117 and the like are input to the control unit 180. The control unit 180 outputs a valve open degree signal S1 to the mode switching valve 170 based on the input signals S2, S3 so as to control operation of the mode switching valve 170, thereby setting an operation mode. In the present embodiment, the control unit 180 is capable of setting a catalyst heating mode, a catalyst keeping mode or a catalyst cooling mode, based on conditions.

The catalyst heating mode is set, when the detected catalyst temperature of the catalyst temperature sensor 106 is lower than a first threshold value Tc1 after the start operation of the engine 102. The first threshold value Tc1 is set based on the lowest temperature for activation of the catalyst 105. In the catalyst heating mode, the mode switching valve 170 is operated and controlled to a closed state at which the valve open degree is zero. In the closed state of the mode switching valve 170 at which the valve open degree is zero, the flow amount of the operation fluid flowing from the condensation portion 140 to the evaporation portion 130 is zero so that the exhaust gas passes through the exhaust gas passage 131 of the evaporation portion 130 without performing heat exchange with the operation fluid.

The catalyst keeping mode is set when the detected catalyst temperature of the catalyst temperature sensor 106 is equal to or higher than the first threshold value Tc1 and is lower than a second threshold value Tc2 after the start operation of the engine 102. Here, the second threshold value Tc2 is set based on an upper limit temperature of the heat resistance of the catalyst 105. In the catalyst keeping mode, the mode switching valve 170 is open by a valve open degree L1, so that heat recovery efficiency can be improved while the detected catalyst temperature of the catalyst temperature sensor 106 can be maintained at least at the first threshold value Tc1. Thus, in the catalyst keeping mode, the operation fluid flows from the condensation portion 140 to the evaporation portion 130 by a flow amount that is set by the valve open degree L1 of the mode switching valve 170. Therefore, in the catalyst keeping mode, the heat of the exhaust gas is radiated to the operation fluid that flows through the evaporation portion 130 by the flow amount corresponding to the valve open degree L1. Thus, the exhaust gas passing through the exhaust gas passage 131 can be cooled by the operation fluid flowing through the evaporation tubes 132, so that the detected catalyst temperature of the catalyst temperature sensor 106 can be maintained at least at the first threshold value Tc1.

The catalyst cooling mode is set, when the detected catalyst temperature of the catalyst temperature sensor 106 is equal to or higher than the second threshold value Tc2 after the start operation of the engine 102. In the catalyst cooling mode, the mode switching valve 170 is open by a valve open degree L2 that is larger than the valve open degree L1. The valve open degree L2 is a valve open degree for keeping the detected coolant temperature of the coolant temperature sensor 117 to be lower than a third threshold value Tw3. In the present embodiment, the third threshold value Tw3 is set based on a radiation allowable temperature of the radiator 113, such that the detected catalyst temperature of the catalyst temperature sensor 106 is lower than the second threshold value Tc2. Furthermore, the second threshold value Tc2 is set based on the upper limit temperature of the heat resistance of the catalyst 105. The valve open degree L2 of the mode switching valve 170 is set to preferentially consider that the detected coolant temperature of the coolant temperature sensor 117 is lower than the third threshold value Tw3, as compared with that the detected catalyst temperature of the catalyst temperature sensor 106 is lower than the second threshold value Tc2.

Thus, in the catalyst cooling mode, the flow amount of the operation fluid flowing from the condensation portion 140 to the evaporation portion 130 is set based on the flow amount flowing through the mode switching valve 170 with the valve open degree L2, and the heat of the exhaust gas is recovered via the operation fluid flowing through the evaporation portion 130 by the flow amount corresponding to the valve open degree L2, thereby cooling the exhaust gas. The exhaust gas is cooled while passing through the exhaust gas passage 131 in the evaporation portion 130, so that detected catalyst temperature of the catalyst temperature sensor 106 is, lower than the second threshold value Tc2. Furthermore, the coolant is heated to a temperature in the condensation portion 140 by receiving heat from the operation fluid, such that the detected coolant temperature of the coolant temperature sensor 117 is lower than the third threshold value Tw3.

Next, the operation of the exhaust heat recovery device 100 according to the present embodiment will be described. FIGS. 5A to 5E are time charts showing the engine load, the valve open degree of the mode switching valve 170, the heat recovery amount of the heat recovery unit 120, the detected catalyst temperature of the catalyst temperature sensor 106 and the detected coolant temperature of the coolant temperature sensor 117. The starting point of the horizontal axis in FIGS. 5A to 5E indicates a start time of the operation of the engine 102. In FIGS. 5A to 5E, "a" indicates a catalyst heating period, "b" indicates an engine heating period, "c" indicates a catalyst keeping period, and "d" indicates a catalyst cooling period. Next, the operation of the exhaust heat recovery device 100 for the respective periods "a" to "d" will be described.

(1) Catalyst Heating Period "a":

The catalyst heating period "a" is a time period from the start time of the operation of the engine 102 to a time at which the detected catalyst temperature of the catalyst temperature sensor 106 is reached to the first threshold value Tc1. That is, the catalyst heating period "a" is a time period for which the catalyst heating mode is set by the control unit 180.

Figure 5A:
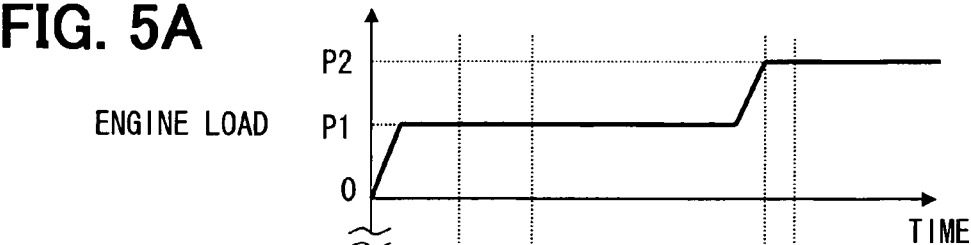
FIGS. 5A to 5E are graphs respectively showing an engine load, a valve open degree of a mode switching valve, a heat recovery amount of the heat recovery unit, a detected catalyst temperature of the catalyst temperature sensor 106 and a detected coolant temperature of the coolant temperature sensor 117, in accordance with time after an engine starts, according to the first embodiment.
Figure 5B:
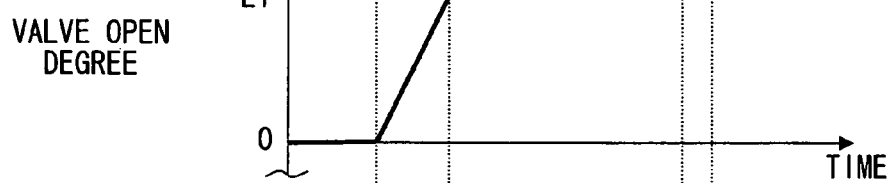

Immediately after the start of the operation of the engine 102, the engine load increases, as shown in FIG. 5A. Then, the engine load P1 is set to an engine load P1 in a general operation. At this time, because the detected catalyst temperature of the catalyst temperature sensor 106 is lower than the first threshold value Tc1, the catalyst heating mode is set. In the catalyst heating mode, the valve open degree of the mode switching valve 170 is set at zero as shown in FIG. 5B, and the operation fluid does not flow from the condensation portion 140 to the evaporation portion 130. Therefore, the heat recovery amount of the heat recovery unit 120 is substantially zero, as shown by the solid-line graph of FIG. 5C.

Figure 5C:
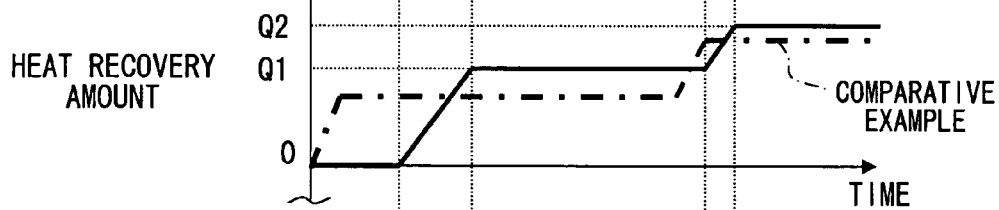
Figure 5D:
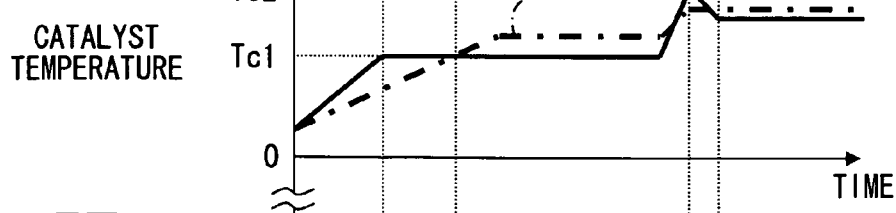

Because the heat recovery amount of the heat recovery unit 120 is zero, the exhaust gas passes through the exhaust gas passage 131 of the evaporation portion 130 without being heat-recovered, and flows to the catalyst 105 with a high-temperature state. Therefore, an increase ratio (gradient) of the detected catalyst temperature of the catalyst temperature sensor 106 during the catalyst heating period "a" becomes larger as compared with a comparative example in which the flow amount of the operation fluid is reduced lower than a predetermined amount. In FIGS. 5C and 5D, the chain line graph indicates the comparative example.

Figure 5E:
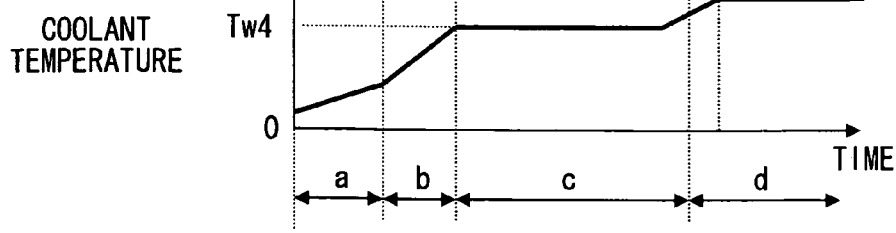

Furthermore, in the catalyst heating period "a" of the present embodiment, the detected coolant temperature is gradually increased by heat radiated from the engine 102, as shown in FIG. 5E.

(2) Engine Heating Period "b":

The engine heating period "b" is a time period from a first time at which the detected catalyst temperature of the catalyst temperature sensor 106 is reached to the first threshold value Tc1 to a second time at which the detected coolant temperature of the coolant temperature sensor 117 is a suitable temperature for the heating of the engine 102 and is reached to a fourth threshold value Tw4. The fourth threshold value Tw4 corresponds to a temperature for starting the radiation at the radiator 113. The engine heating period "b" is a time period for which the catalyst keeping mode is set.

In the engine heating period "b", the engine load is kept at the state of the engine load P1 in the general operation, as shown in FIG. 5A. In this case, because the detected catalyst temperature of the catalyst temperature sensor 106 is equal to or higher than the first threshold value Tc1 and is lower than the second threshold value Tc2, the catalyst keeping mode is set so that the detected catalyst temperature of the catalyst temperature sensor 106 is maintained at the first threshold value Tc1 as shown by the solid line in FIG. 5D. That is, in order to maintain the detected capacity temperature of the catalyst temperature sensor 106 at the first threshold value Tc1, the valve open degree of the mode switching valve 170 is increased from the closed state (i.e., zero open degree) to the valve open degree L1. Because the mode switching valve 170 is opened from the closed state, the heat recovery amount of the heat recovery unit 120 is increased to the heat recovery amount Q1 due to the valve open degree L1, as shown in FIG. 5C. Thus, in the engine heating period "b", as shown in FIG. 5E, the increase ratio (gradient) of the detected coolant temperature of the coolant temperature sensor 117 becomes larger due to the heat recovery amount recovered by the evaporation portion 130, as compared with that in the catalyst heating period "a".

Accordingly, in the engine heating period "b", the increase ratio of the detected coolant temperature of the coolant temperature sensor 117 becomes larger, thereby facilitating the heating of the engine 102.

(3) Catalyst Temperature Keeping Period "c":

The catalyst temperature keeping period "c" is a time period from a state at which the detected coolant temperature of the coolant temperature sensor 117 reaches the fourth threshold value Tw4 to a state at which the detected catalyst temperature of the catalyst temperature sensor 106 reaches the second threshold value Tc2. The catalyst temperature keeping period "c" is also included in the time period for which the catalyst keeping mode is set by the control unit 180, similarly to the engine heating period "b".

In the catalyst temperature keeping period "c", the engine load is maintained at the engine load P1 in the general operation as shown in FIG. 5A, and the catalyst keeping mode is set so that the detected catalyst temperature of the catalyst temperature sensor 106 is maintained at least at the first threshold value Tc1 as shown in FIG. 5D. Therefore, the valve open degree is maintained at the valve open degree L1, and the heat recovery amount is maintained at the heat recovery amount Q1. In the catalyst temperature keeping period "c", if the detected coolant temperature of the coolant temperature sensor 117 becomes higher than the fourth threshold value Tw4, the valve unit 115 made of a thermostat is opened so that heat radiation is started at the radiator 113, and thereby the detected coolant temperature of the coolant temperature sensor 117 can be substantially maintained at the fourth threshold value Tw4.

(4) Catalyst Cooling Period "d":

The catalyst cooling period "d" is a time period from a state where the detected catalyst temperature of the catalyst temperature sensor 106 is increased to the second threshold value Tc2 to a state where the detected catalyst temperature of the catalyst temperature sensor 106 is reduced to and kept at a temperature lower than the second threshold value Tc2 while the detected coolant temperature of the coolant temperature sensor 117 is kept at a temperature lower than the third threshold value Tw3. That is, the catalyst cooling period "d" is a time period for which the catalyst cooling mode is set by the control unit 180.

As shown in FIG. 5A, immediately before the start of the catalyst cooling period "d", the engine load is increased to an engine load P2 that is a high engine load more than the engine load P1 in the general operation. Then, during the catalyst cooling period "d", the engine operation with the high engine load is continued. Accordingly, immediately before the start of the catalyst cooling period "d", the detected catalyst temperature of the catalyst temperature sensor 106 is increased from the first threshold value Tc1 to the second threshold value Tc2. Because the detected catalyst temperature of the catalyst temperature sensor 106 is increased to the second threshold value Tc2 at the start time of the catalyst cooling period "d", the catalyst cooling mode is set, and the valve open degree of the mode switching valve 170 is increased from the valve open degree L1 to the valve open degree L2, and thereby the heat recovery amount is increased from the first heat recovery amount Q1 to the second heat recovery amount Q2. The second heat recovery amount Q2 is a heat quantity recovered by the heat recovery unit 120 when the mode switching valve 170 is opened by the valve open degree L2, and is set such that the detected coolant temperature of the coolant temperature sensor 117 is lower than the third threshold value Tw3.

As a result, at an early time from the start of the catalyst cooling period "d", the valve open degree of the mode switching valve 170 is increased from the valve open degree L1 to the valve open degree L2, and the heat recovery amount of the heat recovery unit 120 is increased from the first heat recovery amount Q1 to the second heat recovery amount Q2, thereby reducing the detected catalyst temperature of the catalyst temperature sensor 106 to a temperature that is lower than the second threshold value Tc2 but is higher than the first threshold value Tc1. For this time, the detected coolant temperature of the coolant temperature sensor 117 is increased to a temperature lower than the third threshold value Tw3, to be maintained at a temperature lower than the third threshold value Tw3 and higher than the fourth threshold value Tw4.

In the exhaust heat recovery device 100 according to the present embodiment, because the evaporation portion 130 is located to be capable of cooling the catalyst 105, it can prevent the catalyst 105 from being super-heated. Furthermore, in the catalyst heating mode, because the heat exchange amount between the operation fluid and the exhaust gas is substantially zero in the evaporation portion 130 of the heat recovery unit 120, the exhaust gas flows to the catalyst 105 without being heat-radiated in the evaporation portion 130. Therefore, it is possible to perform an early heating of the catalyst 105. Furthermore, because the flow amount of the operation fluid is substantially zero in the evaporation portion 130 during the catalyst heating mode, the heat exchange amount between the coolant and the exhaust gas which are heat-exchanged via the operation fluid can be made substantially zero, thereby preventing boiling of the coolant. As a result, the exhaust heat recovery device 100 can realize both of an early heating of the catalyst 105 and the prevention of the coolant boiling in the catalyst heating mode. That is, the heating of the catalyst 105 can be facilitated while it can prevent the coolant from boiling, in the capacity heating mode of the exhaust heat recovery device 100.

According to the exhaust heat recovery device 100 of the present embodiment, in the catalyst cooling mode, because the flow amount of the operation fluid flowing from the condensation portion 140 to the evaporation portion 130 is increased so that heat exchanging amount between the operation fluid and the exhaust gas is increased in the evaporation portion 130, the exhaust gas after being heat-recovered by a large amount in the evaporation portion 130 flows to the catalyst 105. Thus, it is possible to prevent an overheating of the catalyst 105. Furthermore, the flow amount of the operation fluid is increased such that the temperature of the coolant is controlled to be lower than the third threshold value Tw3, thereby preventing the superheating of the coolant. As a result, it is possible to prevent both the superheating of the catalyst 105 and the superheating of the coolant.

According to the exhaust heat recovery device 100 of the present embodiment, in the catalyst keeping mode, the flow amount of the operation fluid flowing from the condensation portion 140 to the evaporation portion 130 is adjusted thereby adjusting the heat exchange amount between the operation fluid and the exhaust heat in the evaporation portion 130, so that the detected catalyst temperature of the catalyst temperature sensor 106 is maintained to the first threshold temperature Tc1. Therefore, the heat recovery amount of the exhaust gas in the evaporation portion 130 can be arbitrarily controlled, and the detected catalyst temperature of the catalyst temperature sensor 106 can be set at a temperature equal to or higher than the first threshold value Tc1 and lower than the second threshold value Tc2, thereby reducing deterioration of the catalyst 105.

In the present embodiment, because the evaporation portion 130 is located in the exhaust gas pipe 103 downstream of the exhaust manifold 104 in a flow direction of the exhaust gas, the operation fluid in the evaporation portion 130 can be effectively heat exchanged with the exhaust gas flowing from the exhaust manifold 104 in the exhaust gas pipe 103.

Second Embodiment

Figure 6:
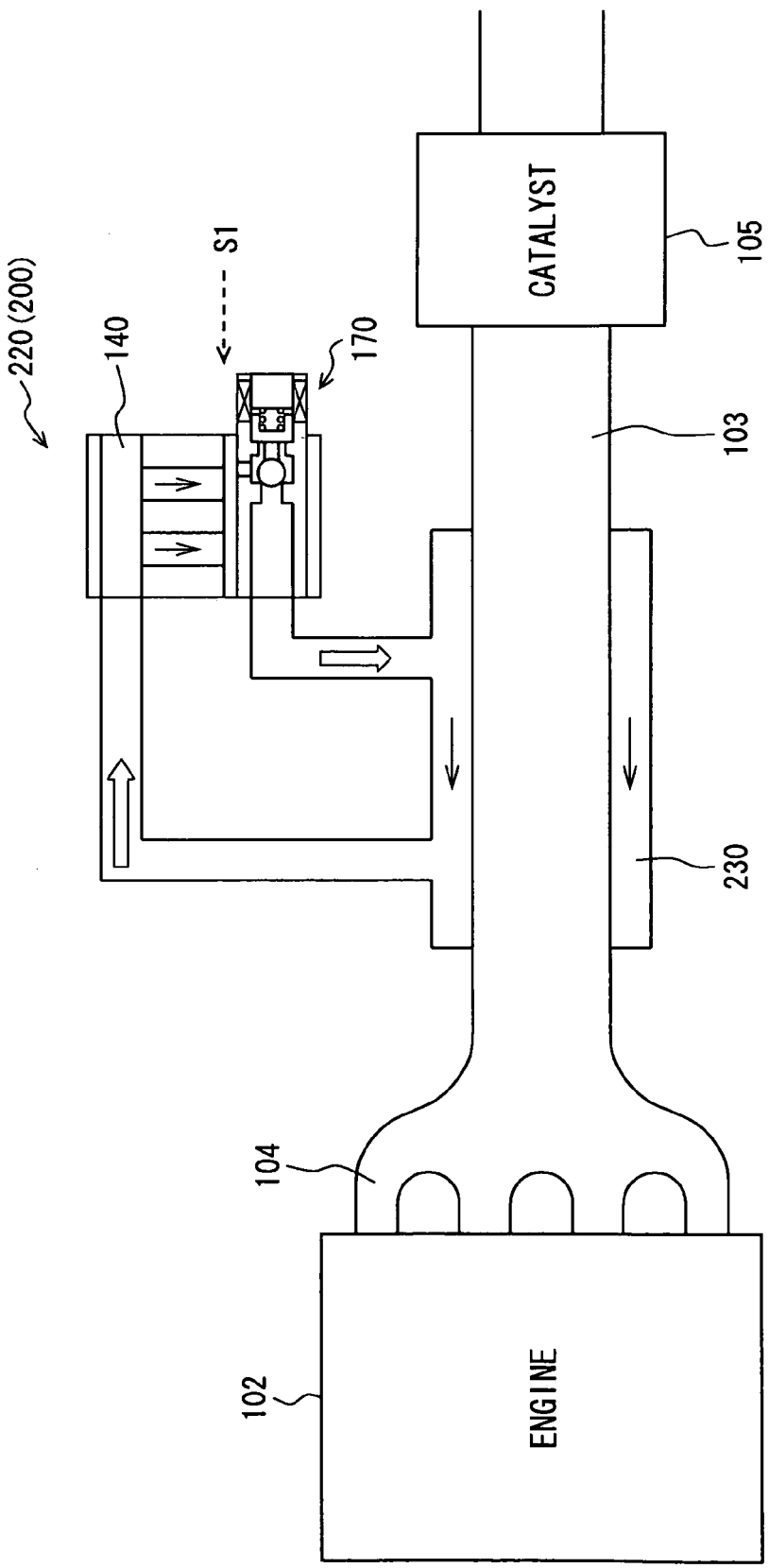
FIG. 6 is a schematic diagram showing an exhaust heat system to which an exhaust heat recovery device according to a second embodiment of the present invention is adapted.

An exhaust heat recovery device 200 according to an example of a second embodiment of the present invention will be described with reference to FIG. 6. In FIG. 6, the parts similar to or corresponding to those of the first embodiment are indicated by the same reference numbers as in the first embodiment, and the detail explanation thereof is omitted.

The exhaust heat recovery device 200 includes a heat recovery unit 220 that includes an evaporation portion 230, in which an operation fluid is capable of being evaporated by absorbing heat from the exhaust gas, and the condensation portion 140. The evaporation portion 230 is located on a surface of the exhaust gas pipe 103 at a position between the exhaust manifold 104 located at one end side of the exhaust gas pipe 103 and the catalyst 105 in the exhaust gas pipe 103. The evaporation portion 230 is located to cover an outer wall surface of the exhaust gas pipe 103 at a portion, so that the exhaust gas flowing in the exhaust gas pipe 103 and the operation fluid of the evaporation portion 230 are heat exchanged. The evaporated operation fluid flows from the evaporation portion 230 to the condensation portion 140 to be condensed in the condensation portion 140, and the condensed operation fluid flows to the evaporation portion 230 from the condensation portion 140 via the mode switching valve 170.

Even in the structure of the exhaust heat recovery device 200 according to the second embodiment, the catalyst heating mode, the catalyst keeping mode and the catalyst cooling mode can be selectively set similarly to the above-described first embodiment. Therefore, the exhaust heat recovery device 200 can realize both of the early heating of the catalyst 105 and the prevention of the coolant boiling in the catalyst heating mode. That is, the heating of the catalyst 105 can be facilitated while it can prevent the coolant from boiling, in the capacity heating mode of the exhaust heat recovery device 200.

Because the evaporation portion 230 is located on the outer wall surface of the exhaust gas pipe 103, the evaporation portion 230 is adapted as a heat-insulation portion of the exhaust gas pipe 103 with respect to the outside air. Thus, when the outside air temperature is low at the winter season or the like, it can restrict the exhaust gas from being cooled at the portion where the evaporation portion 230 is arranged. Furthermore, because the evaporation portion 230 can be configured without using the evaporation tubes 132 of the first embodiment, it can prevent the exhaust heat of the exhaust gas from being absorbed by the evaporation tubes 132.

In the example of FIG. 6, the exhaust gas pipe 103 penetrates through the evaporation portion 230 so that the operation fluid flowing in the evaporation portion 230 outside of the exhaust gas pipe 103 is heat exchanged with the exhaust gas flowing in the exhaust gas pipe 103. The flow direction of the exhaust gas passing through the exhaust gas pipe 103 inside the evaporation portion 230 is made opposite to the flow direction of the evaporation portion 230 flowing outside of the exhaust gas pipe 103 within the evaporation portion 230. The evaporation portion 230 and the condensation portion 140 can be connected by using an evaporation pipe and a condensation pipe, such that the evaporated operation fluid flows from the evaporation portion 230 to the condensation portion 140 by using the evaporation pipe, and the condensed operation fluid flows from the condensation portion 140 to the evaporation portion 130 by using the condensation pipe via the mode switching valve 170.

In the second embodiment, the other parts of the exhaust heat recovery device 200 are similar to those of the exhaust heat recovery device 100 of the above described first embodiment.

Third Embodiment

Figure 7:
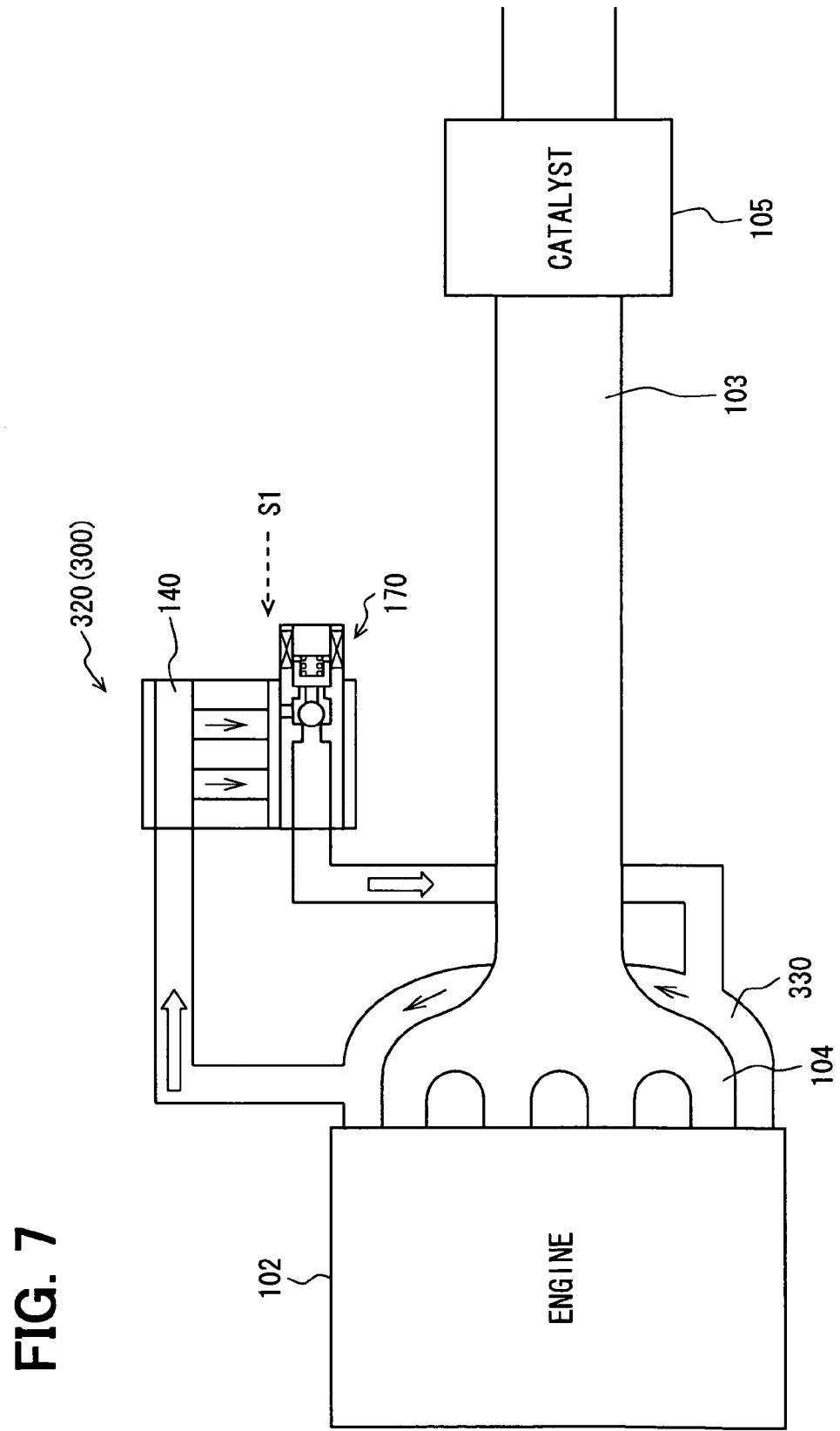
FIG. 7 is a schematic diagram showing an exhaust heat system to which an exhaust heat recovery device according to a third embodiment of the present invention is adapted.

An exhaust heat recovery device 300 according to an example of a third embodiment of the present invention will be described with reference to FIG. 7. In FIG. 7, the parts similar to or corresponding to those of the first embodiment are indicated by the same reference numbers as in the first embodiment, and the detail explanation thereof is omitted.

The exhaust heat recovery device 300 includes a heat recovery unit 320 that includes an evaporation portion 330, in which an operation fluid is capable of being evaporated by absorbing heat from the exhaust gas, and the condensation portion 140. In the above-described second embodiment, the evaporation portion 230 is located on the surface of the exhaust gas pipe 103 at a position between the exhaust manifold 104 and the catalyst 105. However, in the third embodiment, the heat recovery unit 320 is located on a surface of the expansion manifold 104 that is an end portion of the exhaust gas pipe 103. The evaporation portion 330 is located to cover the exhaust manifold 104, so that the exhaust gas in the exhaust manifold 104 and the operation fluid in the evaporation portion 330 are heat exchanged. The evaporated operation fluid flows from the evaporation portion 330 to the condensation portion 140 to be condensed in the condensation portion 140, and the condensed operation fluid flows to the evaporation portion 330 from the condensation portion 140 via the mode switching valve 170.

Even in the structure of the exhaust heat recovery device 300 according to the third embodiment, the catalyst heating mode, the catalyst keeping mode or the catalyst cooling mode can be selectively set similarly to the above-described first embodiment. Therefore, the exhaust heat recovery device 300 can realize both of the early heating of the catalyst 105 and the prevention of the coolant boiling in the catalyst heating mode. That is, the heating of the catalyst 105 can be facilitated while it can prevent the coolant from boiling, in the capacity heating mode of the exhaust heat recovery device 300.

Because the evaporation portion 330 is located on the outer wall surface of the exhaust manifold 104, the evaporation portion 330 is adapted as a heat-insulation portion of the exhaust manifold 104 with respect to the outside air. In the present embodiment, the exhaust gas having the highest temperature flows through the exhaust manifold 104, and the outer wall surface of the exhaust manifold 104 is covered by the evaporation portion 330. Thus, even when the outside air temperature is low at the winter season or the like, it can restrict the exhaust gas from being cooled at the exhaust manifold 104.

Furthermore, because the evaporation portion 330 can be configured without using the evaporation tubes 132 of the first embodiment, it can prevent the exhaust heat of the exhaust gas from being absorbed by the evaporation tubes 132.

In the example of FIG. 7, the evaporation portion 330 is provided with an evaporation passage covering the exhaust manifold 104. Furthermore, the evaporation portion 330 and the condensation portion 140 are connected by using an evaporation pipe and a condensation pipe, such that the evaporated gas refrigerant flows from the evaporation portion 330 to the condensation portion 140 by using the evaporation pipe, and the condensed operation fluid flows from the condensation portion 140 to the evaporation portion 330 by using the condensation pipe via the mode switching valve 170.

In the third embodiment, the other parts of the exhaust heat recovery device 300 are similar to those of the exhaust heat recovery device 100 of the above described first embodiment.

Fourth Embodiment

Figure 8:
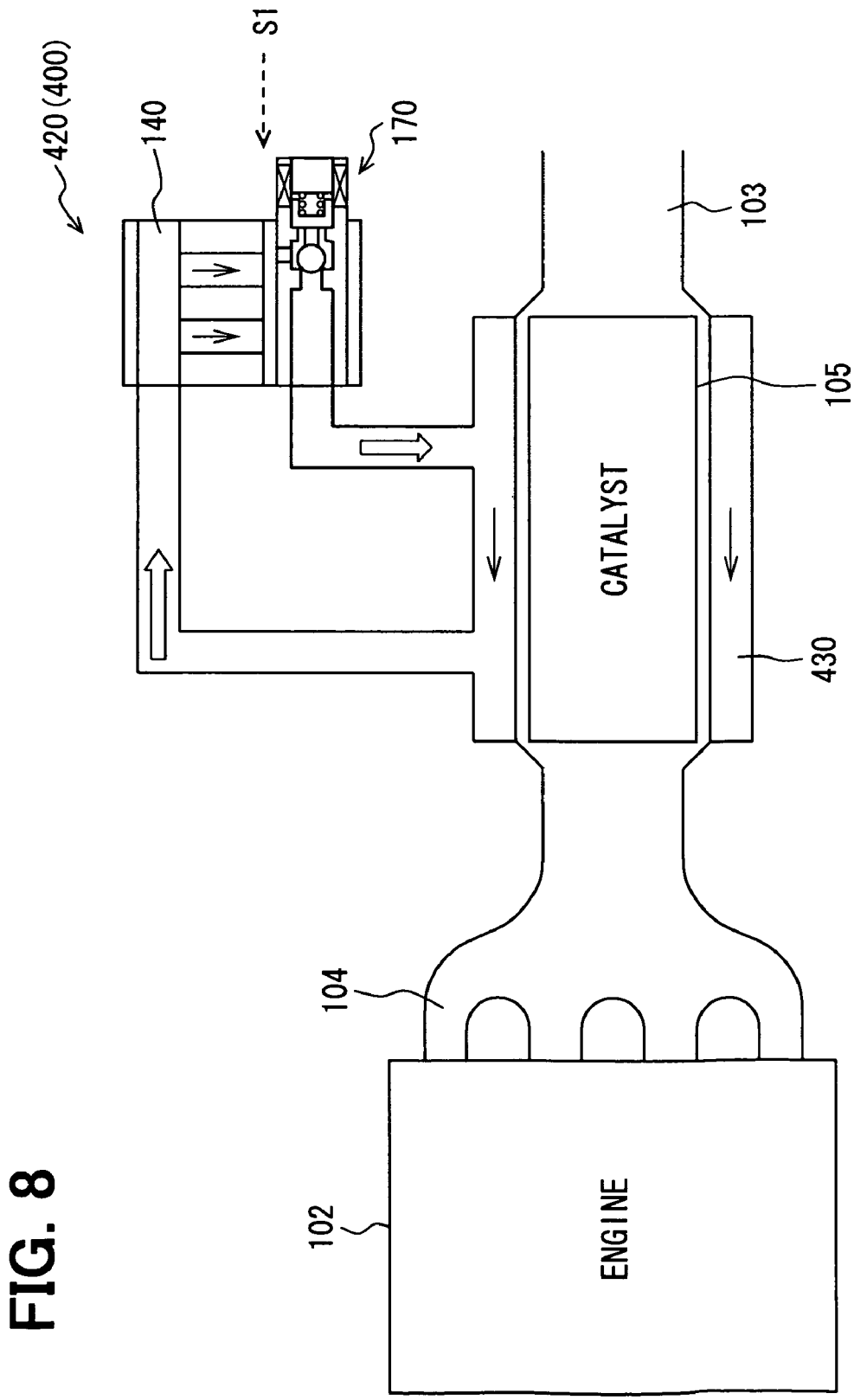
FIG. 8 is a schematic diagram showing an exhaust heat system to which an exhaust heat recovery device according to a fourth embodiment of the present invention is adapted.

An exhaust heat recovery device 400 according to an example of a fourth embodiment of the present invention will be described with reference to FIG. 8. In FIG. 8, the parts similar to or corresponding to those of the first embodiment are indicated by the same reference numbers as in the first embodiment, and the detail explanation thereof is omitted.

The exhaust heat recovery device 400 includes a heat recovery unit 420 that is provided with an evaporation portion 430, in which an operation fluid is capable of being evaporated by absorbing heat from the exhaust gas, and the condensation portion 140. The evaporation portion 430 is located on a surface of the exhaust gas pipe 103 at a position where the catalyst 105 is held in the exhaust gas pipe 103. The evaporation portion 430 is located to cover an outer wall surface of the exhaust gas pipe 103 at the portion where the catalyst 105 is held in the exhaust gas pipe 103, so that the exhaust gas flowing through the catalyst 105 within the exhaust gas pipe 103 and the operation fluid of the evaporation portion 430 are heat exchanged. The evaporated operation fluid flows from the evaporation portion 430 to the condensation portion 140 to be condensed in the condensation portion 140, and the condensed operation fluid flows to the evaporation portion 430 from the condensation portion 140 via the mode switching valve 170.

Even in the structure of the exhaust heat recovery device 400 according to the fourth embodiment, the catalyst heating mode, the catalyst keeping mode or the catalyst cooling mode can be selectively set similarly to the above-described first embodiment. Therefore, the exhaust heat recovery device 400 can realize both of the early heating of the catalyst 105 and the prevention of the coolant boiling in the catalyst heating mode. That is, the heating of the catalyst 105 can be facilitated while it can prevent the coolant from boiling, in the capacity heating mode of the exhaust heat recovery device 400.

The evaporation portion 430 is located downstream of the exhaust manifold 104, on the outer wall surface of the exhaust gas pipe 103, at the holding position where the catalyst 105 is held in the exhaust gas pipe 103. Therefore, the evaporation portion 430 can be located close to the catalyst 105, thereby suitably and immediately controlling the catalyst temperature even when the temperature of the catalyst 105 is largely changed. Furthermore, the evaporation portion 430 can be adapted as a heat-insulation portion of the exhaust gas pipe 103 with respect to the outside air. In addition, because the evaporation portion 430 can be configured without using the evaporation tubes 132 of the first embodiment, it can prevent the exhaust heat of the exhaust gas from being absorbed by the evaporation tubes 132 similarly to the above-described second embodiment.

In the fourth embodiment, the other parts of the exhaust heat recovery device 400 are similar to those of the exhaust heat recovery device 100 of the above described first embodiment.

Although the present invention has been fully described in connection with the preferred embodiments thereof with reference to the accompanying drawings, it is to be noted that various changes and modifications will become apparent to those skilled in the art.

For example, in the above-described first embodiment, the catalyst 105 and the evaporation portion 130 are arranged to be separate from each other. However, the catalyst 105 may be arranged integrally with the evaporation portion 130. For example, the catalyst 105 may be held on the fins 134 provided in the evaporation portion 130. In this case, because the catalyst 105 is arranged in the evaporation portion 130 integrally with the evaporation portion 130, the heat recovery unit 120 and the catalyst 105 can be easily mounted to the exhaust gas pipe 103.

In the above-described fourth embodiment, the catalyst 105 may be arranged integrally with the evaporation portion 430, at the holding portion of the exhaust gas pipes 103, where the catalyst 105 is held.

In the above-described embodiments, the catalyst temperature sensor 106 is arranged in the catalyst 105 as a catalyst temperature detector. However, as the catalyst temperature detector, the other means or a device may be used for detecting the temperature of the catalyst 105. For example, an exhaust gas temperature sensor may be located to detect the temperature of the exhaust gas at a position immediately upstream of the catalyst 105, thereby determining the temperature of the catalyst 105. Alternatively, an upstream exhaust gas temperature sensor is located to detect a first temperature of the exhaust gas at a position immediately upstream of the catalyst 105, and a downstream exhaust gas temperature sensor is located to detect a second temperature of the exhaust gas at a position immediately downstream of the catalyst 105, and the average value of the detected first and second temperatures may be used as the catalyst temperature signal S2 to be input to the control unit 180.

In the above-described embodiments, the coolant temperature sensor 117 is located at the coolant outlet portion of the engine 102. However, a coolant temperature sensor generally known may be used to be capable of detecting the temperature of the coolant in the coolant passage 111.

In the above-described embodiments, the valve open degree L2 of the mode switching valve 170 is set such that the detected coolant temperature of the coolant temperature sensor 117 becomes lower than the third threshold value Tw3 preferentially, as compared that the detected catalyst temperature of, the catalyst temperature sensor 106 becomes lower than the second threshold value Tc2. However, the setting of the valve open degree L2 of the mode switching valve 170 is not limited to the above. For example, the valve open degree L2 of the mode switching valve 170 may be set such that the detected catalyst temperature of the catalyst temperature sensor 106 becomes lower than the second threshold value Tc2 preferentially, as compared that the detected coolant temperature of the coolant temperature sensor 117 becomes lower than the third threshold value Tw3. Alternatively, the valve open degree L2 of the mode switching valve 170 may be set such that the detected catalyst temperature of the catalyst temperature sensor 106 becomes lower than the second threshold value Tc2, regardless of the detected coolant temperature of the coolant temperature sensor 117. Here, the second threshold value Tc2 is set based on the upper limit temperature of the heat resistance of the catalyst 105, and the third threshold value Tw3 is set based on the radiation allowable temperature of the radiator 113 such that the detected catalyst temperature of the catalyst temperature sensor 106 is lower than the second threshold value Tc2.

In the above-described embodiments, the valve open degree L2 is set larger than the valve open degree L1, as shown in FIG. 5B. However, the valve open degree L2 for the mode switching valve 170 may be set smaller than the valve open degree. L1 such that the detected coolant temperature of the coolant temperature sensor 117 becomes lower than the third threshold value Tw3. Alternatively, the valve open degree L2 for the mode switching valve 170 may be set smaller than the valve open degree L1 such that the detected catalyst temperature of the catalyst temperature sensor 106 becomes lower than the second threshold value Tc2. Alternatively, the valve open degree L2 of the mode switching valve 170 may be set smaller than the valve open degree L1, such that the detected coolant temperature of the coolant temperature sensor 117 becomes lower than the third threshold value Tw3, and the detected catalyst temperature of the catalyst temperature sensor 106 becomes lower than the second threshold value Tc2.

Such changes and modifications are to be understood as being within the scope of the present invention as defined by the appended claims.

What is claimed is:

1. An exhaust heat recovery device for recovering heat from exhaust gas of an engine, the exhaust heat recovery device comprising:
   a catalyst located to purify the exhaust gas;
   a heat recovery unit that includes
      an evaporation portion configured to evaporate an operation fluid flowing therein by performing heat exchange between the operation fluid and the exhaust gas, and configured to be capable of cooling the catalyst, a condensation portion configured to cool and condense the operation fluid flowing from the evaporation portion by performing heat exchange between the operation fluid and a coolant for cooling the engine, and a flow adjusting valve which adjusts a valve open degree of the flow adjusting valve to adjust a flow amount of the operation fluid flowing from the condensation portion to the evaporation portion;

a catalyst temperature detector adapted to detect a temperature of the catalyst; and a control unit configured to set a catalyst heating mode when the temperature of the catalyst detected by the catalyst temperature detector is lower than a first threshold value, wherein the control unit causes the flow adjusting valve to adjust the flow amount of the operation fluid from the condensation portion to the evaporation portion to zero flow, in the catalyst heating mode.

2. The exhaust heat recovery device according to claim 1, wherein the control unit is configured to set a catalyst cooling mode when the temperature of the catalyst detected by the catalyst temperature detector is higher than a second threshold value that is larger than the first threshold value, and the control unit causes the flow adjusting valve to adjust the flow amount of the operation fluid in the catalyst cooling mode, such that the temperature of the catalyst detected by the catalyst temperature detector becomes equal to or higher than the first threshold value and lower than the second threshold value.

3. The exhaust heat recovery device according to claim 2, further comprising a coolant temperature detector configured to detect a temperature of the coolant, wherein the control unit causes the flow adjusting valve to adjust the flow amount of the operation fluid from the condensation portion to the evaporation portion, such that the temperature of the coolant detected by the coolant temperature detector is lower than a third threshold value, in the catalyst cooling mode.

4. The exhaust heat recovery device according to claim 2, wherein the control unit is configured to set a catalyst keeping mode when the temperature of the catalyst detected by the catalyst temperature detector is equal to or higher than the first threshold value and is lower than the second threshold value, and the control unit causes the flow adjusting valve to adjust the flow amount of the operation fluid in the catalyst keeping mode, such that the temperature of the catalyst detected by the catalyst temperature detector approaches the first threshold value.

5. The exhaust heat recovery device according to claim 1, wherein the evaporation portion is located in an exhaust gas pipe, in which the exhaust gas of the engine flows, at a position downstream of an exhaust manifold that is positioned at one end portion of the exhaust gas pipe adjacent to the engine.

6. The exhaust heat recovery device according to claim 1, wherein the evaporation portion is located on an outer surface of an exhaust gas pipe, in which the exhaust gas of the engine flows.

7. The exhaust heat recovery device according to claim 6, wherein the evaporation portion is located on the surface of the exhaust gas pipe, at a position where the catalyst is held in the exhaust gas pipe.

8. The exhaust heat recovery device according to claim 1, wherein the evaporation portion is located on an outer surface of an exhaust manifold that is positioned at one end portion of an exhaust gas pipe adjacent to the engine.

9. The exhaust heat recovery device according to claim 1, wherein the catalyst is provided integrally with the evaporation portion.

10. The exhaust heat recovery device according to claim 1, wherein the heat recovery unit is a heat pipe type, which includes an evaporation pipe through which the evaporated operation fluid of the evaporation portion flows into the condensation portion, and a condensation pipe through which the condensed operation fluid of the condensation portion flows to the evaporation portion, and the flow adjusting valve is located to adjust the flow amount of the operation fluid flowing from the condensation portion to the evaporation portion via the condensation pipe.

11. The exhaust heat recovery device according to claim 1, wherein the flow adjusting valve includes a valve body that is located in an operation fluid passage through which the operation fluid flows from the condensation portion to the evaporation portion, and the valve open degree of the flow adjusting valve is controlled based on a control signal from the control unit, thereby adjusting the flow amount of the operation fluid in the operation fluid passage.

12. The exhaust heat recovery device according to claim 1, wherein the catalyst is located in an exhaust pipe in which the exhaust gas flows, and the flow adjusting valve is located in the exhaust pipe at an upstream side of the catalyst in a flow direction of the exhaust gas.

13. The exhaust heat recovery device according to claim 1, wherein the catalyst is located in an exhaust pipe in which the exhaust gas flows, and the evaporation portion of the heat recovery unit is located in the exhaust pipe at an upstream side of the catalyst in a flow direction of the exhaust gas.

14. The exhaust heat recovery device according to claim 1, wherein an opening degree of the flow adjusting valve is based on the temperature of the catalyst.

15. The exhaust heat recovery device according to claim 1, wherein the control unit is configured to set a catalyst keeping mode based on the temperature of the catalyst, the control unit causing the flow adjusting valve to open to a first position allowing a first flow greater than zero in the catalyst keeping mode.

16. The exhaust heat recovery device according to claim 1, wherein the control unit is configured to set a catalyst cooling mode based on the temperature of the catalyst, the control unit causing the flow adjusting valve to open to a second position allowing a second flow greater than the first flow in the catalyst cooling mode.

* * * * *